United States Patent Office 3,686,145
Patented Aug. 22, 1972

3,686,145
HYDROXYCARBOXYLIC ACID POLYMERS
FROM POLYACROLEINS
Heinz Haschke, Grossauheim, and Erich Bäder, Hanau am Main, Germany, assignors to Deutsche Gold- und Silber-Scheideanstalt vormals Roessler, Frankfurt am Main, Germany
No Drawing. Filed Jan. 30, 1970, Ser. No. 7,251
Claims priority, application Germany, Feb. 1, 1969,
P 19 04 941.3
Int. Cl. C08f 3/40
U.S. Cl. 260—67 U          4 Claims

ABSTRACT OF THE DISCLOSURE

Solid linear or cross-linked hydroxycarboxylic acid polymers which in the main chain have predominantly carbon-to-carbon bonds, all, or the major part of the units in the main chain, having the formula

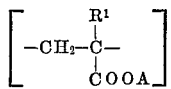

and

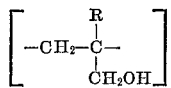

and/or

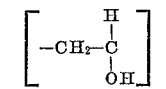

wherein R and R' are the same or different and are alkyl having 1 to 6 carbon atoms or hydrogen and wherein $R^1$ may also be halogen. In addition, there may be a minor amount, relative to the number of the units (I), (II) and (III), of units of the formula

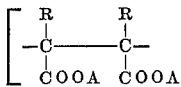

wherein A is hydrogen, one valence of a monovalent or a polyvalent metal or ammonium. All of these units are arranged in random sequence and their number is such that the ratio of carboxyl or carboxylate to hydroxyl groups is between 1.1 and 16. The minimum degree of polymerization is 3; preferably, it is not above 5000, and particularly between 3 and 600.

The polymers are valuable as complexing agents.

RELATED APPLICATIONS

The manner of use of the compounds of the present invention forms the subject matter of an application filed by the same inventors concurrently herewith and entitled Process of forming complexes by means of hydroxy-carboxylic acid polymers as complexing agents.

BACKGROUND OF THE INVENTION

The invention relates to polymeric hydroxy-carboxylic acids which have a specific ratio between carboxylic or carboxylate groups, on the one hand, and hydroxyl groups on the other hand.

It is known to polymerize acrolein in the presence of radical catalysts. There are obtained in this case carbon-to-carbon bond polymerizates which are interrupted by only a few acetal bonds (Makromolekulare Chemie 53 (1962), p. 145 ff.; 100 (1967), p. 208).

Acrolein has also been polymerized in the presence of a catalyst and in the presence of $H_2O_2$ in larger than catalytic amounts. In this case there may also be present monomeric vinyl compounds. The thus obtained polymers contained carboxyl groups (German Pat. 1,071,339). This type of polymer is suitable for making synthetic materials and lacquers.

In addition, polyacrolein has been reacted in the presence of a strong base with formaldehyde to form products which, in addition to carboxyl groups, predominantly contain alcohol groups (Makromolekulare Chemie 67 (1963), p. 186 ff.).

SUMMARY OF THE INVENTION

In the present invention, the solid linear or cross-linked hydroxycarboxylic acid polymers have a main chain predominantly consisting of carbon-to-carbon bonds, all, or the major part, of the units in the main chain having the formulae

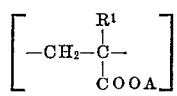 (I)

and

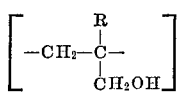 (II)

and/or

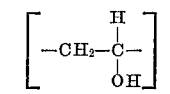 (III)

wherein R and $R^1$ are the same or different and are alkyl having 1 to 6 carbon atoms or hydrogen and wherein $R^1$ may also be halogen and wherein A is hydrogen, one valence of a monovalent or a polyvalent metal or ammonium. In addition, there may be a minor amount, relative to the number of the units of (I), (II) and (III), of units of the formula

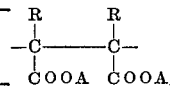 (IV)

wherein A is as defined above and the ratio of carboxyl or carboxylate to hydroxyl groups being as defined in claim 1. All of these units are arranged in random sequence and their average frequency is such that the ratio of carboxyl or carboxylate to hydroxy groups is between 1.1 and 16. The minimum degree of polymerization is 3. Preferably, it is not above 5000, and most particularly between 3 and 600.

DESCRIPTION OF THE PREFERRED EMBODIMENTS

Preferably, when R and $R^1$ are alkyl, either one or both may be methyl. However, most preferably, R and/or $R^1$ are hydrogen.

The ratio between carboxyl and carboxylate groups to hydroxyl groups preferably is between 2 and 9. The degree of polymerization of the polymers preferably is between 3 and 5000 and most perferably is between 3 and 600.

In the units identified by Formulae I and IV above, A preferably is an alkali metal, and most preferably sodium.

The polymers of the invention may have vinyl or carbonyl groups in side-chains in minor amounts relative to the amounts of the units identified as (I), (II) and (III) above.

The preferred use of the polymers is as complexing agents. Compared with the prior-art complexing agents, which usually were nitrogen-, phosphorus- or sulfur-containing compounds, the polymers do not present any problems for sewage disposal and do not cause corrosion. Compared with the polymerizates described in the Belgian Pat. 611,797, the polymers of the invention have the advantage that the complexes formed by them with metal ions are several times as stable and also have a substantially better solubility and are furthermore stable in a much broader pH range.

The polymers of the invention may for instance be made by copolymerization of acrolein, acrylic acid or substituted acrylic acids in the presence of radical catalysts or redox catalysts and subsequently undergoing a Cannizzaro reaction. They can also be made, for instance, by copolymerization, if desired, of substituted acrylic acids with allyl alcohol, or saponification of copolymers of acrylic acid ester and esters of vinyl alcohol or its derivatives such as acrylonitrile.

Another way of making the polymers is by means of oxidation of copolymers of acrolein with allyl alcohol or its derivatives or with vinyl alcohol derivatives. Also a cyclopolymerization of allyl acrylate or a cyclocopolymerization of allyl acrylate with acrylic acid upon simultaneous saponification and an oxidation of polyacrolein-homo- or copolymerizates is possible.

For the polymerization, all types of polymerization methods, such as precipitation, bulk- or solution-polymerization, may be chosen.

The preferred process of making these polymers is by oxidative polymerization of acrolein and subsequent treatment of the polymerizate with a strong base, particularly with an alkali hydroxide according to the Cannizzaro method. The treatment with the strong base in a less preferred variant may also be effected upon simultaneous condensation with formaldehyde. There are then obtained polymers which additionally have units of the formulae

and

which latter two units should be present in minor amounts compared to the units identified as (I), (II) and (III).

In all cases, it is necessary to select the polymerization and reaction conditions, and in particular the amount of the oxidizing agent, in such a manner that the ratio of carbonyl or carboxylate groups to hydroxyl groups in the final product is as defined above and, furthermore, in such a manner that the minimum degree of polymerization is 3. In other words, there must be the required number of different units as defined above.

As oxidation agents, peroxides or peracids may be used. Preferred is the oxidation with $H_2O_2$. In case of the oxidation polymerization, it is possible to adjust the ratio of carboxyl to carbonyl groups by the ratio of oxidizing agent to amount of acrolein. The higher this ratio, the larger will be the number of carboxyl groups in the final polymer, and conversely. Since the peroxide compound also acts as chain-regulating agent, it will be understood that the degree of polymerization will be controlled also by the amount of oxidizing agent. The degree of polymerization decreases with an increasing amount of oxidizing agent and conversely. For instance, with a ratio of $H_2O_2$ to acrolein of 1:1, it is possible to obtain an average polymerization degree of 3.2 and a COOH/C=O ratio of 5:1. On the other hand, if under otherwise the same conditions, the ratio employed is 0.7:1, the degree of polymerization will be 13 and the ratio between carboxyl group and C=O group will be 3.2:1.

The oxidation polymerization of the acrolein can also be carried out in the presence of other copolymerizable monomers in virtually any desired amounts. The use of acrylic acid is preferred since this will directly influence the contents of carboxyl groups in the polymer. Besides, the acrylic acid content in the starting product also affects the degree of polymerization in that this degree increases with the content of acrylic acid.

Examples of other copolymerizable monomers are: alkylacrylic acids, halogeno-acrylic acids, unsaturated polycarboxylic acids, particularly maleic acid, and derivatives thereof such as esters and nitriles; furthermore, vinylalcohol derivatives, allylalcohols and derivatives of the latter, etc.

The homo- or copolymerization of the acrolein can be carried out, depending on the desired contents of carboxyl groups in the final polymer, both in solution and as precipitation polymerization and, preferably, in an aqueous medium. If peroxy compounds are used as oxidation agents, it is preferred, first, to introduce these compounds and, if desired, the comonomer or a part thereof into an aqueous solution or suspension, and to add the acrolein and, if desired, the residual comonomer only at an increased temperature of, for instance, between 50 and 100° C.

In case of a solution polymerization, the polymers obtained can be used, if desired, directly for further reactions preferably after concentration of the solution. It is advisable in this case to destroy any residual amounts of oxidizing agent that may be present in the solution, for instance by addition of small amounts of $MnO_2$ or activated carbon. It is, however, also possible to precipitate the solution polymers from the mass by means of a dilute acid, for instance hydrochloric acid. In this operation the remaining monomers can be recovered, for instance by distillation, directly from the reaction mass. The distillation residue in this case constitutes a highly concentrated, aqueous solution of the polymer which can be used for further reaction.

It is, however, also possible to go through with the distillation up to dryness, and thus to obtain the pure polymer in solid form.

If the polymerization is carried out as a precipitation polymerization, it is easy to separate the polymers by filtration. The residual monomers in the filtrate can then be used for further purposes in the form in which they are present in the filtrate. The precipitation polymer can be purified with water or, if desired, by passing air therethrough.

The thus-obtained polyaldehydo-carboxylic acids can be further reacted in an aqueous solution or suspension with a strong base, in the presence of formaldehyde if desired. This can be carried out by using the formaldehyde in about the stoichiometric amount relative to the aldehyde groups which are present in the polymer and by stirring for an extended period of time at room temperature or at an elevated temperature up to about 100° C. After 2 hours, the yield is already about 60–70%, and within 24 hours will increase to 90–100%. The Cannizzaro reaction may, be carried out much more rapidly, by selecting suitable conditions, and this particularly in the case of the reaction was water-soluble polyaldehydo-carboxylic acids.

The reaction in solution results in solutions which, in addition to the salts of the hydroxycarboxylic acid polymers, contain an excess of a base. They can be concentrated by evaporation to dryness. The thus-obtained salt can be used directly as complexing agent. By precipitation from the reaction mass, for instance with methanol, the salts are obtained in a particularly pure form. However, the solution may also be neutralized prior to evaporation with a dilute acid such as hydrochloric acid, or the free acid may be precipitated. Likewise, the course of the Cannizzaro reaction may be controlled in such a manner that eventually virtually neutral salt solutions are obtained. This can be accomplished by selecting the amount of added base in such a manner that the excess of base decreases with continuing reaction, and finally, at the end of the reaction, just reaches zero.

The neutralization of the excess base should be effected only with a type of acid of which the salts do not interfere in the use of the polymers. Such acid is, for instance, carbon dioxide. However, it is preferred to carry out the neutralization with the hydroxycarboxylic acid polymers themselves in pure form or directly with the reaction products of the first reaction stage, that is the polyadehydo-carboxylic acids or the solutions or suspensions thereof. In this manner, there are obtained pure, neutral solutions of the salts of the hydroxycarboxylic acid polymers from which the latter can easily be isolated by evaporation of the water. The hydroxycarboxylic acids which are used for the neutralization can, for instance, be precipitation polymers obtained as described above. They can easily be precipitated from the solutions obtained in the reactions by means of a dilute acid.

The polymers of the invention, as already pointed out, predominantly have carbon-to-carbon bonds in the main chain. They can be linear or cross-linked. The polymers predominantly consist of the above-identified units (I) and (II) and/or (III). There units are the main portion of the main chain which is predominantly formed by carbon-to-carbon bonds. They are in part formed when the polyaldehydo-carboxylic acid is subjected to the Cannizzaro reaction. In this reaction, there may however also be formed intermolecular aldol condensations between the active CH groups which are α-oriented relative to the aldehyde groups in the polyaldehydo-carboxylic acid and, on the other hand, the carbonyl groups of one or several adjacent chains. In this way there result cross-linking connections. It is, in any case, essential for the use of the polymers as complexing agents that there be present the identified units (I) and (II) and/or (III).

In case of the use also of further comonomers in addition to acrolein and possibly an acrylic acid such as maleic acid and/or vinyl alcohol derivatives and/or allyl alcohol units of the type (III) and (IV), as defined above, may be present in minor amounts in the main chain. The amounts may be up to 50 mol.-percent. These units can be used to control the water solubility and/or the acidity and thus the use of the complexing agents in extreme pH ranges.

Units of the type (V) and (VI) form if the reaction of the polyaldehydo-carboxylic acids is carried out with a strong base by the Cannizzaro method in the presence of formaldehyde. The amount of aldehyde in this case will control the degree of cross-linking.

In spite of the fact that the making of the polyaldehydo-carboxylic acids is effected by radical polymerization of acrolein, there may be present in the main chain units of the formula $$\left[\begin{array}{c}-O-CH-\\ |\\ CH=CH_2\end{array}\right]$$

in minor amounts up to 25 mol.-percent. There may also be minor amounts of unmodified carbonyl groups in the final polymer. Both groups, however, are without significance for the use of the polymers as complexing agents. Also without significance are the terminal groups in the polymer which depend on the reaction conditions and the reaction medium. If the starting materials are acrolein and $H_2O_2$, one of the two terminal groups will always be a hydroxyl group. In all other cases, the terminal groups are COH—, $CH_2$—OH—, COOH— or $CH_2$=CH groups or hydrogen atoms or residues of the employed catalysts.

As has been stated, the polymers thus obtained will have a minimum polymerization degree of 3. There is no limit upwards except as determined by the intended use. For instance, the polymerization degree may be as high as about 5000.

As has already been explained, the polymers of the invention can be used in a very broad manner as complexing agents. Their use is possible wherever metal traces are undesirable. Examples for such use are for instance the use in detergents, rinsing agents, laundry additives and purifying agents. Furthermore, they may be used in bleaching operations for wood and textiles, in the textile and paper manufacture, in the pharmaceutical and food industries, in the polymer chemistry, in the metal-treating and -processing industry, and particularly in connection with electrolyte baths.

The invention is further illustrated by the following examples. The Hampshire-Test mentioned in some of these examples is described in the company publication of the Hampshire Chemical Corporation, of June 1960 "Hampshire NTA Technical Bulletin," Appendix S. A2.

In this test, exactly 2 g. of a pulverulent complexing agent are dissolved in 50 ml. distilled water. The solution is neutralized, and 10 ml. of a 2% sodium carbonate solution are added. Then, the solution is adjusted to a pH between 11 and 12, and diluted to a volume of 100 ml. This is followed by titration with a calcium acetate solution which contains 44.1 g. of calcium acetate monohydrate per liter until a distinct and permanent turbidity appears. The calcium carbonate bonding action of the bonding agent is calculated according to the following formula:

$$\frac{\text{Ml. calcium acetate solution} \times 25}{\text{initial input of complexing agent}}$$

= mg. bonded $CaCO_3$/g. of complexing agent

The thus-ascertained Hampshire radical value of the complexing agent is also somewhat of an indication of the effectiveness of these products as builders in detergents.

The individual stability of the several complexes as indicated in the examples was determined as follows:

(1) Determination of the stability with $Ca^{++}$: Measurement of the concentration of free $Ca^{++}$ in the equilibrium of the complex formations by means of the color complex between $Ca^{++}$ and the metal indicator dye "Eriochromblack T" by defining the complex stability constant as follows:

$$K_{stab} = \frac{[CaPODC]}{[Ca^{++}][PODC^{--}]}$$

In this equation, $PODC^{--}$ constitutes the anions of the polymeric "hydroxydicarboxylic" acid which form the complexing agents. The measurements were carried out in $NH_4OH$—$NH_4Cl$ buffered solution at a pH of 10.

(2) Determination of the complex stability with $Fe^{+++}$: The measurement was effected by means of the solubility product of the $Fe(OH)_3$ in ammoniacal solution at pH 11, the complex stability constant being defined as follows:

$$K_{stab} = \frac{[FePOC^{++}]}{[Fe^{+++}][POC^-]}$$

In this equation $POC^-$ stands for the anions of the complexing agent constituted by the polymeric hydroxy monocarboxylic acid.

(3) Determination of the complex stability with $Mn^{++}$, $Ca^{++}$, $Ag^+$: This is effected by measuring the electron spin resonance of the free metal ion concentration present in the complex equilibrium. In case of $Ag^+$, this is done by shifting the equilibrium of the complex formation with $Mn^{++}$ because of the $Ag^+$ ions which are not determinable in the paramagnetic spin resonance. The definition of the equilibrium constants is as follows:

$$K_{stab}^{Mn^{++}} = \frac{[MnPODC]}{[Mn^{++}][PODC^{--}]}$$

$$K_{stab}^{Cu^{++}} = \frac{[CuPODC]}{[Cu^{++}][PODC^{--}]}$$

$$K_{stab}^{Ag^+} = \frac{[AgPODC^-]}{[Ag^+][PODC^{--}]}$$

$PODC^{--}$ in these equations has the same meaning indicated above at (1).

The percentage statements regarding the contents of carboxyl and hydroxyl groups relate to the number of COOH or OH groups per 100 monomer units, that is $C_2$ units in the chain, of the polymer molecule.

EXAMPLE 1

(a) 520 ml. distilled water and 260 ml. of 30% hydrogen peroxide were heated to a temperature of 60° C. As soon as the solution reached a temperature of 50° C., the addition of acrolein was started. Within a time of 2½ hours, 400 ml. of freshly distilled acrolein was added dropwise. During this time, a white, flocky polymer already began to precipitate. Then, after completion of the acrolein addition, the mass was subjected to stirring for another 2 hours at 60° C. upon a slight reflux which, in the end, completely ceased. The solution was then diluted with 500 ml. and after another hour at 60° C. with still another 500 ml. of distilled water. The reaction mixture was permitted to cool down and, after standing for a few hours, was filtered. The precipitate was washed with distilled water until free of odor and was dried in a vacuum at 50° C. over NaOH. There were thus obtained 186 g. of polyaldehydocarboxylic acid of an average molecular weight $\overline{M}=7500$; polymerization degree: about 120; carboxyl content: 44%; carbonyl content: 27%.

(b) 100 g. of the polyaldehydo-carboxylic acid made as in (a) above were suspended in 400 ml. distilled water. 100 ml. of a 40% formaldehyde solution was then added to the suspension. 125 ml. of a 40% NaOH solution was then passed into the mixture while stirring during a period of 40 minutes. 10 minutes after commencement of the NaOH addition, the reaction mixture turned highly viscous and was then diluted with 400 ml. of distilled water. After adding 60 ml. of the total NaOH amount the viscosity dropped steeply. There was obtained a clear, thin, flowing, bright-yellow solution. After being permitted to stand for a few hours, the solution was subjected to precipitation by pouring it into 200 ml. of a 20% HCl solution. It was then permitted to settle for 15 minutes, and the solution was thereafter decanted from the precipitate. The precipitate was washed with distilled water. After a preliminary drying, a preliminary grinding, washing and final drying, there were obtained 66 g. of hydroxycarboxylic acid polymer with a carboxyl-groups content of 58% and a hydroxyl content of 31%.

(c) 15 ml. of 1 N sodium hydroxide was then passed into the suspension while stirring. A check of the pH after 15 minutes showed a value of 7. The undissolved portions were removed by filtration and the solution was subjected to evaporation until the mass was dry. There was obtained 3.5 g. of hydroxycarboxylic acid polymer in the form of the Na salt. This salt had a complex stability with $Ca^{++}$ determined by the lg $K_{stab}=0.34$, measured at an ionic strength of $I=0.23$ mol.l.$^{-1}$. The product could bond 300 mg. $CaCO_3$ per gram of complexing compound according to the Hampshire Test described above.

(d) A hydroxycarboxylic acid polymer solution formed according to (b) above and neutralized with a 20% hydrochloric acid to a pH of 7 was treated until dry. There was obtained 150 g. of a salt mixture of which 85% consisted of the sodium salt of the hydroxycarboxylic acid polymer and 15% consisted of NaCl. The stability constant of the complex of this salt mixture (calculated for 100% hydroxy-carboxylic acid polymer-sodium-salt) was 1g $K_{stab}=190$ with $Ca^{++}$ measured at an ionic strength $I=0.24$ mol/l. The Hampshire Test value was 325.

EXAMPLE 2

α-Ethylacrolein was subjected to an oxidative polymerization in the manner of Example 1. There was again obtained a polyaldehydocarboxylic acid which was then converted by subsequent Cannizzaro reaction in an aqueous suspension with alkali hydroxide to directly form the complexing agent in the form of a hydroxycarboxylic acid polymer having a COOH content of 50% and an OH content of 21%.

The product had for instance a complex stability with $Ca^{++}$ determined as follows: 1g $K_{stab}=2.55$ measured at an ionic strength of 0.24 mol/l.

The Hampshire Test value was 180. The complex stability of the complexing agent with $Fe^{+++}$ was defined by 1g $K_{stab}=29.6$ relative to an ionic strength $I=1.0$ mol/l. This product, in addition, has strongly surface-active properties.

EXAMPLE 3

(a) A mixture of 500 ml. distilled water and 500 ml. of a 30% $H_2O_2$ was heated in a bath to a temperature of 50° C. While stirring vigorously and causing a slight reflux, 300 ml. acrolein was then added dropwise within a period of 4 hours. This caused the reaction temperature to rise to 65° C. At the completion of the acrolein addition, the mass was further stirred for another 2½ hours at the same temperature, and was then permitted to cool down. After standing for a few hours, 0.025 g. $MnO_2$ was added and the reaction mixture was concentrated to half its volume. There was obtained a highly viscous, clear distillation residue (A).

10% of the distillation residue (A) was treated in a vacuum until dry in order to determine the yield and for further analysis. There was obtained 8.7 g. of a pure solid polymer. Its mean molecular weight was $\overline{M}=1800$. polymerization degree about 28; carboxyl content: 59%; carbonyl content: 21%.

(b) 500 ml. of the distillation residue (A) was diluted with 500 ml. of distilled water. This solution was added dropwise together with 250 ml. of a 40% NaOH solution into a stirred mass of 250 ml. of 40% formaldehyde. The addition was made by dropping, at such a speed as would maintain a reaction temperature below 40° C. 30 minutes after completion of the addition, another 60 ml. of 40% NaOH was added to the reaction mixture. After adding 20 ml. of this NaOH addition, the color of the solution turned from colorless to dark red-brown (pH 7.2), and after adding the total of 60 ml. it turned from dark red-brown to bright yellow (pH 11.5) which latter indicated that the required NaOH amount had been added.

(c) After precipitation of the hydroxycarboxylic acid polymer obtained as described in Example 3(b) by means of dilute hydrochloric acid, the polymer was washed free of chloride residues and was treated then with the stoichiometric amount of the base. There was obtained a complexing agent solution from which the pure solid complexing agent could easily be recovered.

An example of the activity of this product is the following:

Complex formation with $Ca^{++}$: 1g $K_{stab}=2.16$ (measured at an ionic strength $I=0.24$ mol./liter). Hampshire Test value=400.

EXAMPLE 4

(a) In this example a distillate was used as obtained in the recovery of the residual monomer by concentration of the mass as described below in Example 11. This distillate consisted of about 7% acrylic acid, 1% acrolein and 92% water. 430 ml. of this distillate was mixed with 400 ml. 30% $H_2O_2$. 365 ml. of freshly distilled acrolein were then added to the reaction mixture while stirring and heating over a bath at 60° C. The introduction was started at a temperature of 55° C. and was continued dropwise for a period of about 5 hours. After completion of the acrolein addition the mass was briefly heated to about 80° C. and then permitted to cool down. It was then concentrated to about half its volume and there was thus obtained a solution of a polyaldehydo-carboxylic acid of COOH content equal to 80%, of a C=O of 20%, $\overline{P}=10$. This solution was immediately used as will presently be described.

(b) ⅖ (that is about 200 ml.) of the polyaldehydocarboxylic acid solution made as just described in (a) of this example was mixed with 272 ml. distilled water. To this solution there was dropwise added an amount of 175 ml. of a 40% concentration NaOH solution within a time of 1½ hours while stirring. After a few hours standing, there was obtained an alkaline solution of the salt of a hydroxy carboxylic acid polymer. After neutralization with a similarly formed hydroxycarboxylic acid polymer (formed as described in Example 3(b)) the complexing agent solution was complete. The pure product could be easily recovered from the solution by evaporation of the water. It formed, for instance, complexes with $Ca^{++}$ ions which are characterized by the lg $K_{stab}=1.9$ (measured at an ionic strength $I=0.24$ mol/l.). The Hampshire test value was 325.

EXAMPLE 5

(a) 500 ml. of distilled water and 125 ml. $H_2O_2$ were heated while stirring to 55° C. and, as soon as this temperature had been reached, a mixture of 125 ml. of freshly distilled acrolein and 308 ml. of freshly distilled acrylic acid were added dropwise within a period of four hours. At the end of the acrolein-acrylic acid addition, the reaction mass solidified to a gel and was then distilled with 1150 ml. of distilled water. After a few hours standing, the gel-like product was subjected to drying in a vacuum over NaOH at 75° C. Thus the pure solid polymer was obtained. Specifically, there was obtained 320 g. of polyaldehyde-carboxylic acid of a COOH content of 80% and a carbonyl content of 12% and for this product $\bar{P}=320$.

(b) 250 g. of a polyaldehydo-carboxylic acid as obtained in (a) of this example was suspended in 750 ml. of distilled water. 125 ml. of a 40% formaldehyde was then added to the suspension and, thereafter, 325 ml. of a 40% NaOH solution was added dropwise while stirring within a time period of about 3 hours. After a few hours standing, ⅕ of the thus-formed hydroxycarboxylic acid polymer was precipitated with dilute hydrochloric acid, washed and dried. There was obtained a product having 62.8% COOH content and 13.5% OH content.

(c) The remaining ⅘ of the polymeric acid mass was neutralized with 8 g. of a solid hydroxycarboxylic acid polymer which had been obtained by any of the above-described processes. There was thus obtained a pure aqueous solution of the complexing agent. By evaporation of the water, the pure solid agent was obtained of which the activity appears from the following table:

| Complexes with— | Characterized by— |
|---|---|
| $Ca^{++}$ | 1 g. $K_{stab}=2.2$ (measured at an ionic strength $I=0.24$ mol/l.). |
| $Fe^{+++}$ | 1 g. $K_{stab}=31.2$ (measured at a pH of 12.1 relative to an ionic strength $I=1.0$ mol/l.). |
| $Mg^{++}$ | Lack of precipitation with: $OH^-$, $CO_3^{--}$, $F^-$. |
| $Ba^{++}$ | Lack of precipitation with: $CO_3^{--}$, oxalate$^{--}$. |
| $La^{+++}$ | Lack of precipitation with: oxalate$^{--}$, $CO_3^{--}$, $PO_4^{3-}$. |
| $Cr^{+++}$ | Lack of precipitation with: $PO_4^{3-}$. |
| $Co^{++}$ | Lack of precipitation with: $OH^-$, $CO_3^{--}$, $PO_4^{3-}$. |
| $Ni^{++}$ | Lack of precipitation with: $PO_4^{3-}$, $OH^-$, $CO_3^{--}$. |
| $Zn^{++}$ | Lack of precipitation with: $CO_3^{--}$. |
| $Cd^{++}$ | Lack of precipitation with: oxalate$^{--}$, $OH^-$, $CO_3^{--}$. |
| $Tl^+$ | Lack of precipitation with: $BrO_3^-$. |
| $Pb^{++}$ | Lack of precipitation with: $SO_4^{--}$, $OH^-$, in strongly alkaline solution also $CO_3^{--}$. |

EXAMPLE 6

A polyaldehydo-carboxylic acid was formed by oxidative copolymerization of acrolein with acrylic acid in the presence of hydrogen peroxide as described above. The acid had the following characteristics: $\bar{P}=600$, COOH content=56%, C=O content=9%. This acid was subjected to a Cannizzaro reaction upon simultaneous condensation with formaldehyde. There was thus formed a salt of a hydroxy carboxylic acid polymer with a COOH content of 54% and an OH content of 10%. The activity of this complexing agent is shown by the following values, for instance:

Complex formation with $Ca^{++}$: lg $K_{stab}=2.12$ (measured at an ionic strength $I=0.24$ mol/l.)
Complex formation with $Fe^{+++}$: lg $K_{stab}=29.3$ (relative to an ionic strength of $I=1.0$ mol/l.)
Hampshire Test value=306.

EXAMPLE 7

(a) 20 g. of a polyaldehydocarboxylic acid with the following characteristics

COOH content _____ percent__ 41
C=O content _____ do____ 9
$\bar{P}$ _____ 150 was suspended in 250 ml. distilled water. 20 ml. of a 40% HCHO solution and, thereafter, while stirring, 50 ml. of a 40% NaOH solution were slowly added. Subsequently, another 50 ml. of a 40% HCHO solution were added, and the mixture was stirred another hour at room temperature. After precipitation with 225 ml. of a 10% HCl solution, washing and drying, there was obtained 18 g. of a hydroxycarboxylic acid polymer having a COOH content of 64% and an OH content of 11%.

(b) The salt of this hydroxycarboxylic acid polymer may, as described in (a) of this example, form complexes with metal ions as follows: lg $K_{Fe}^{3+}=27.5$ relative to an ionic strength $I=1.0$ mol/l.; Hampshire Test value=111.

EXAMPLE 8

The polyaldehydo-carboxylic acid used in this example was made by any of the above-described methods. It had the following characteristics: $\bar{P}=3.2$, COOH content =67%, C=O content=14%. This acid was reacted with formaldehyde and KOH. There was obtained a complexing agent in the form of the potassium salt of a hydroxycarboxylic acid polymer which had an activity as appears, for instance, from the complex formation with $Ca^{++}$:

lg $K_{stab}=1.61$ (measured at an ionic strength of $I=0.24$ mol/l.)
Hampshire Test value=245.

EXAMPLE 9

(a) A mixture of 430 ml. of distillate from the residual monomer recovery containing 1% acrolein and 7% acrylic acid and 92% water was mixed with 400 ml. of a 35% concentration $H_2O_2$. 365 ml. of freshly distilled acrolein was then added to the mixture while stirring and heating the mixture in a bath to 60° C., the addition being made dropwise, and it being complete after 4 hours. The reaction temperature was maintained at 65° C. by slight cooling. At the end of the acrolein addition, 3.0 g. benzoyl peroxide was added. The mass was then stirred for another 3 hours at 65° C. Thereafter, 0.04 g. $MnO_2$ and the mixture was slowly permitted to cool down. The volume was then concentrated to about 600 ml. There was thus obtained a 63% concentration polyaldeydehydo-carboxylic acid solution of the following characteristics: COOH content=68%, C=O content=20%, $\bar{P}=9$.

(b) The highly viscous polymer solution by the steps in (a) of this example was then diluted with 540 ml. of distilled water and thereafter mixed with 93 ml. of a 40% formaldehyde solution. 345 ml. of a 40% concentration NaOH were then slowly added. There are thus obtained a faintly alkaline hydroxycarboxylic acid sodium polymer solution which could be further processed to obtain the pure complexing agent as described above. The activity of the agent was, for instance, with $Ca^{++}$ ions, as follows:

lg $K_{Ca}^{++}=1.76$ (measured at an ionic strengt $I=0.24$ mol/l.); Hampshire Test value=410.

EXAMPLE 10

(a) A mass was formed from 376 ml. of a 7% acrylic acid and 468 ml. of a 30% $H_2O_2$ and was heated on a bath to 60° C. while being stirred. Starting at a temperature of 55° C. 326 ml. of acrolein was added within a period of about 3 hours. The maximum reaction temperature hardly increased above 60° C. After a few hours standing, the excess $H_2O_2$ was again destroyed with $MnO_2$. The polyaldehydo-carboxylic acid could then be obtained in pure form. There was obtained 296 g. of a product having a COOH content of 77% and a carbonyl content of 15%. $\overline{P}=3$.

(b) This product was then reacted with alkali hydroxide in the presence of formaldehyde and the alkaline complexing agent solution was neutralized by the Cannizzaro method by adding solid hydroxycarboxylic acid polymer. There was thus obtained an aqueous, about 40% concentration solution of a complexing agent. The product had the following illustrative activities:

| Water soluble complexes with— | Characterized by— |
|---|---|
| $Ca^{++}$ | 1 g. $K_{stab}=2.06$ (measured at an ionic strength of $I=0.24$ mo./l.). |
| $Fe^{+++}$ | 1 g. $K_{stab}=29.4$ (measured at $pH=11.7$; relative to an ionic strength of $I=1.0$ mol/l.). |
| $Mg^{++}$ | Lack of precipitation with: $OH^-$, $CO_3^{--}$, $F^-$. |
| $Ba^{++}$ | Lack of precipitation with: $CO^{--}$, oxalate$^{--}$. |
| $La^{+++}$ | Lack of precipitation with: oxalate$^{--}$, $CO_3^{--}$, $PO_4^-$ |
| $Cr^{+++}$ | Lack of precipitation with: $PO_4^{--}$. |
| $Co^{++}$ | Lack of precipitation with: $OH^-$, $CO_3^{--}$, $PO_4^{---}$. |
| $Ni^{++}$ | Lack of precipitation with: $PO_4^{3-}$, $OH^-$, $CO_3^{--}$. |
| $Zn^{++}$ | Lack of precipitation with: $CO_3^{--}$. |
| $Cd^{++}$ | Lack of precipitation with: oxalate$^{--}$, $OH^-$, $CO_3^{--}$. |
| $Tl^+$ | Lack of precipitation with: $BrO_3^{--}$. |
| $Pb^{++}$ | Lack of precipitation with: $SO_4^{--}$, $OH^-$, in strongly alkaline solution also $CO_3^{--}$. |

EXAMPLE 11

(a) 350 ml. of freshly distilled acrolein was poured into a mixture of 350 ml. distilled water and 500 ml. of 30% $H_2O_2$ which mixture had been warmed to 55° C. The addition of the acrolein was effected under stirring within 2.2. hours. During the addition the reaction temperature goes to 65° C. and, 1 hour after completion of the acrolein addition, it reached 70° C. After that, another 25 ml. of 30% $H_2O_2$ were added. After a further hour, the temperature of the mixture had risen to 80° C. It was then cooled to 50° C. whereupon the residual unreacted $H_2O_2$ was destroyed by addition of 50 mg. $MnO_2$. After about 1 hour of stirring at 50° C., the mass was concentrated in vacuo to about half the liquid volume. There was thus obtained a distillate that contained 7% acrylic acid and about 1% acrolein in water and could immediately be used for the next run. 10% of the polymer solution was evaporated to dryness for determination of the yield and analysis, while the remainder was used for further reaction. There was obtained a total of 250 g. (relative to the total yield of polyaldehydo-carboxylic acid with a COOH content of 72%, a carbonyl content of 14% and $\overline{P}=5$).

(b) 450 ml. of the thus-formed polymer solution was reacted with 80 ml. of a 40% concentration formaldehyde solution. 211 ml. of a 40% concentration NaOH solution were then added to the mixture under stirring within a time of 45 minutes. The mixture at the same time was slightly cooled to keep the reaction temperature below 70° C. After completion of the NaOH addition, stirring was continued for an hour until the reaction temperature had gone down to 30° C. Thereafter, further addition of 300 ml. of a 40% NaOH solution was made. After a few hours standing, the mixture was neutralized with 51 g. of a hydroxycarboxylic acid polymer. The water was evaporated and the residue dried. There were thus obtained 480 g. of hydroxycarboxylic acid salt polymer which had the following activity:

$$\lg K_{Ca^{++}} = 1.54$$

measured at an ionic strength of $I=0.24$ mol/l.; Hampshire Test value=320.

EXAMPLE 12

(a) 500 ml. of distilled water and 250 ml. of a 30% $H_2O_2$ concentration were mixed and heated while being stirred to 55° C. At this temperature, addition was started of 220 ml. acrolein and 205 ml. acrylic acid (both freshly distilled). The addition was effected dropwise and was complete after 3.75 hours. Stirring was continued for another hour at 60° C. At the end of this period the mixture had by itself risen in temperature to 65° C. upon formation of a highly viscous polymer foam. The mixture was then diluted with 1 liter of distilled water, was thoroughly stirred and permitted to further react for a few hours at room temperature. Thereafter, it was again diluted with 500 ml. of distilled water whereupon thixotropic gel was converted by vigorous stirring to a low viscosity liquid. Excess hydrogen peroxide was destroyed by addition of 0.25 g. of activated carbon and heating to 56° C. The water was then evaporated and the mass dried to obtain the pure solid polymer. There were obtained 275 g. of polyaldehydocarboxylic acid of a COOH content of 71%, a carbonyl content of 22% and a $\overline{P}$ of 60.

(b) 1100 ml. of the gel formed according to (a) of this example and containing 237 g. of dry solids were diluted, after destruction of the excess hydrogen peroxide, with 240 ml. distilled water. Thereupon, 107 ml. of a 40% formaldehyde solution were added, and then 443 ml. of a 40% concentration NaOH solution were poured upon stirring into the mass within a period of about 4 hours. After a few hours standing, another 20 ml. of a 40% concentration NaOH solution were added and again permitted to stand for a few hours and then filtered.

(c) ⅘ of this alkaline hydroxycarboxylic acid polymer in the form of its Na-salt solution was then neutralized with 8 g. of a solid hydroxycarboxylic acid polymer made according to any of the previous examples. The undissolved fractions were removed by filtration. There was thus obtained a 21% solution of a complexing agent which could be directly employed as in all other examples or, alternatively, from which by evaporation of the water the complexing agent could be obtained in pure solid form. The activity is illustrated, for instance, as follows: With $Ca^{++}$: $\lg K_{stab}=2.06$ measured at an ionic strength of $I=0.24$ mol/l.; Hampshire Test value=377.

EXAMPLE 13

(a) A product was formed by the process described later in Example 14, that is by oxidative copolymerization of acrolein with acrylic acid and maleic acid. The starting product was 50 mol-percent acrylic acid and 10 mol-percent maleic acid relative to the amount of acrolein; 10 mol-percent excess acrolein relative to the $H_2O_2$ amount. The product had an average polymerization degree $\overline{P}=65$, a COOH content of 70%, a C=O content of 30%. The product was obtained in a yield of about 75% of the theoretical yield. This product was then subjected to a Cannizzaro reaction as follows:

(b) 400 ml. of an about 40% concentration solution of the polymer as described was mixed with 233 ml. distilled water. 440 ml. of a 20% NaOH solution were then gradually added dropwise upon stirring and the final pH was adjusted to 11. After a few hours standing, the reaction mixture had been adjusted to a pH of 9.5. It was then neutralized again to a pH of 7. This resulted immediately in a solution of the complexing agent of 25% concentration. The activity was as follows:

Complex formation with $Ca^{++}$: $\lg K_{stab}=2.05$ (measured at an ionic strength of $I=0.24$ mol/l.). Hampshire test value 360.

Complex formation with $Fe^{+++}$: $\lg K_{stab}=29.0$ (relative to an ionic strength $I=1.0$ mol/l.).

EXAMPLE 14

(a) A solution was prepared of 225 g. maleic acid anhydride in 400 ml. distilled water and 800 ml. 30% $H_2O_2$. The solution was placed on a heating bath to be brought to a temperature of 60° C. As soon as it has reached 50° C., 700 ml. acrolein was added dropwise while stirring within a period of 4.3 hours. After a few hours standing, the solution was filtered off the precipitated polymer. There was obtained a polyaldehydo-carboxylic acid having a COOH content of 46%, a C=O content of 43%, a $\overline{P}$ of 90 (22 mol-percent maleic acid units). The filtrate was an aqueous solution of a low molecular polyaldehydo-carboxylic acid of a similar structure and could also be used as in the previous examples for forming the complexing agent.

(b) 50 g. of the polyaldehydo-carboxylic acid made according to (a) of this example was suspended in 38 ml. distilled $H_2O$ and 50 ml. of a 40% formaldehyde. 65 ml. of a 40% concentration NaOH was then gradually added while stirring. After completion of the alkali addition, the mixture was permitted to stand for a few hours. It was then neutralized with freshly precipitated hydroxycarboxylic acid polymer made according to any of the previous examples. The polymer was still wet from the washing to remove the acid. After removing by filtration the undissolved fractions, an aqueous solution of the complexing agent was obtained. Its activity is illustrated by the following examples:

Complex formation with $Ca^{++}$: 1g $K_{stab}=1.52$ (measured at an ionic strength I=0.25 mol/l.). Hampshire Test value 224

Complex formation with $Fe^{+++}$: 1g $K_{stab}=29.6$ (relative to an ionic strength I=1.0 mol/l.).

EXAMPLE 15

(a) 110 ml. distilled water and 270 ml. of a 30% $H_2O_2$ were mixed and heated in a heating bath having a temperature of 50° C. so that the mixture also had reached this temperature. Within a period of 75 minutes, a mixture of 200 ml. freshly distilled acrolein and 216 ml. freshly distilled acrylic acid were then added while continuously stirring. This caused the reaction temperature to rise to 65° C. and finally, 15 minutes after completion of the acrolein-acrylic acid addition, to reach 100° C. while a slight reflux continued. The reaction mixture was then brought to a temperature of 30° C. by adding 1000 ml. distilled water and cooling from the exterior. This had the result that the polymer flakes which had precipitated during the heat treatment got gradually redissolved. The reaction mixture was then permitted to stand for a few hours, and during that time solidified to a highly viscous, slightly opalescing solution.

The solution was then diluted with 500 ml. of distilled water and was precipitated while being stirred with 300 ml. of a 20% hydrochloric acid. The white cheese-like precipitate was permitted to settle for about 1 hour. It was then filtered, washed free of acid with distilled water and dried in vacuo at 60° C. over NaOH. There were thus obtained 187 g. of a polyaldehydo-carboxylic acid having a mean molecular weight $\overline{M}=8100$, a polymerization degree of about 120, a carboxyl content of 69% and a carbonyl content of 26%.

(b) 166 g. of the polyaldehydo-carboxylic acid was suspended in 500 ml. of distilled water. 800 ml. of a 40% formaldehyde solution and 166 ml. of a 40% NaOH were then introduced into the suspension within a period of 40 minutes. After removing some undissolved fractions by filtration from the clear bright-yellow solution, the solution was permitted to stand for a few hours and was then neutralized by addition of solid hydroxycarboxylic acid polymer made according to Example 3. The addition was effected in 2 g. batches. After a total of 12.3 g. of hydroxycarboxylic acid polymer had been dissolved, a pH value of the solution between 5 and 6 was obtained. The undissolved fractions were then removed by filtration and the solution evaporated to dryness.

The solid salt was dried at 110° C. in a vacuum and there were thus obtained 175 g. of solid hydroxycarboxylic acid sodium salt polymer with a complex stability with $Ca^{++}$ ions as follows: 1g $K_{stab}=2.05$ measured at an ionic strength I=0.23 mol/l. Hampshire test value=500;

With $Fe^{+++}$: 1g $K_{stab}=29.1$ (pH=11.5; I=1.0 mol./l.)
With $Mn^{++}$: 1g $K_{stab}=4.5$ (pH=9.4 I=0.1 mol./l.)
With $Cu^{++}$: 1g $K_{stab}=2.7$ (pH=9.7 I=0.25 mol./l.)
With $Ag^{+}$: 1g $K_{stab}=3.7$ (pH=7.0 I=0.025 mol./l.).

Thus, the solubility product of AgCl is not exceeded if there is present the complexing agent in a concentration of 1 mol/liter in case of a $5 \cdot 10^{-4}$ molar $Ag^+$ solution with $Cl^-$ ions in a concentration up to $10^{-3}$ mol/l. Thus, no AgCl is precipitated, even in the least desirable case where no further supersaturation effects occur.

EXAMPLE 16

(a) 1529 ml. of an aqueous crude acrolein solution, which was free of stabilizers and contained about 25% acrolein, was introduced into 660 ml. of a 30% concentration $H_2O_2$ while heating in a bath of a temperature of 60° C. The addition was made dropwise at a dropping rate of 10 ml. per minute while stirring. After adding 0.08 g. $MnO_2$, the solution was then concentrated to a volume of about 1100 ml. There was obtained an approximately 40% concentration polyaldehydo-carboxylic acid solution having a COOH content of 68%, a C=O content of 20% and a $\overline{P}$ of 9.

(b) 600 ml. of this polymer solution were diluted in 380 ml. of distilled water. The solution was adjusted to a pH of 12 while stirring by addition of a 20% concentration NaOH added at a rate of 10 ml. per minute. After standing for a few hours, the solution was neutralized. The thus-obtained complexing agent had the following illustrative activities related to the pure solid product:

Complex formation with $Ca^{++}$: 1g $K_{stab}=1.45$ (measured at an ionic strength of I=0.24 mol/l.); Hampshire Test value 356

Complex formation with $Fe^{+++}$: 1g $K_{stab}=28.5$ (relative to an ionic strength I=1.0 mol/l.).

EXAMPLE 17

A polyaldehydo-carboxylic acid solution was formed by the process of Example 16(a) by using a crude acrolein solution which was hydroquinone-stabilized and was an aqueous solution having a COOH content of 80%, a C=O content of 20% and a $\overline{P}$ of 18 relative to the pure solid polymer. By means of a Cannizzaro reaction as described in Example 16(b), the polyaldehydo-carboxylic acid solution was converted to a hydroxycarboxylic acid salt polymer solution having a COOH content of 58%, an OH content of 7% relative to the pure solid polymer. The product again had complexing properties with metal ions as is shown by the following examples which relate to the activity of the pure solid sodium salt of the hydroxycarboxylic acid.

Complex formation with $Ca^{++}$: 1g $K_{stab}=1.83$ (measured at an ionic strength I=0.24 mol/l.); Hampshire Test value 326

Complex formation with $Fe^{+++}$: 1g $K_{stab}=30.2$ (relative to an ionic strength of 1.0 mol/l.)

EXAMPLE 18

(a) A mixture was formed upon stirring of 800 ml. 30% $H_2O_2$ and 400 ml. distilled water. Into the mixture which was warmed on a bath was then passed a mixture of 580 ml. freshly distilled acrolein and 117 ml. distilled acrylic acid dropwise at a dropping rate of 3.0 ml. per minute. After completion of the reaction, a highly viscous polyaldehydo-carboxylic acid solution of about 34% concentration was obtained which had a COOH content of 75%, a C=O content of 21% and a P=10 relative to the pure solid polymer.

(b) 500 ml. of the solution of this polymer was gradually reacted while stirring with 405 ml. of 20% concentration NaOH. After standing for a few hours, precipitation was effected with methanol. After brief drying of the precipitate at 100° C. in a vacuum, a pure solid sodium salt of the hydroxycarboxylic acid polymer was obtained which had the following complexing properties:

Complex formation with Ca$^{++}$: lg K$_{stab}$=1.8 (measured at an ionic strength I=0.24 mol/l.); Hampshire Test value 334

Complex formation with Fe$^{+++}$: lg K$_{stab}$=28.5 (relative to an ionic strength of 1.0 mol/l.).

EXAMPLE 19

(a) A mixture of 945 ml. distilled water, 307 ml. freshly distilled acrolein and 168 ml. freshly distilled acrylic acid were heated to 55° C. Beginning at this temperature, and while vigorously stirring, 105 ml. of a 30% H$_2$O$_2$ solution were poured into the mixture within a period of 1.5 hours. The mixture was subsequently diluted with 200 ml. distilled water, and the temperature was slowly increased to 70° C. After the temperature, due to the heat of reaction, had further risen to 75° C., the mixture was diluted with 200 ml. distilled water and cooled to 50° C. Subsequently, precipitation was effected with 200 ml. of a 10% HCl solution. The mixture was then permitted briefly to settle and subjected to filtration. After washing and drying of the polymer, there was obtained 165 g. of a polyaldehydo-carboxylic acid having a COOH content of 58% and a carbonyl content of 6% and a $\bar{P}$ of 110.

(b) 100 g. of this polyaldehydo-carboxylic acid were suspended in 300 ml. of distilled water. 50 ml. of a 40% HCHO solution were added to the suspension. While stirring, 87 ml. of a 40% concentration NaOH was slowly introduced into the solution. After 50 minutes stirring, the reaction mixture reacted neutral. Another 43 ml. of a 40% NaOH solution was then added, and the mixture was permitted to stand for a few hours. Thereafter, precipitation was effected with 231 ml. of a 20% HCl solution. After washing and drying, there was obtained 89 g. of hydroxycarboxylic acid polymer with a COOH content of 73% and an OH content of 8%.

(c) By treatment of the hydroxycarboxylic acid polymer with NaOH, the highly water-soluble salt was obtained which had the following characteristics as complexing agent:

lg K$_{Ca^{++}}$=1.82

(measured at an ionic strength of 0.24 mol./l.);Hampshire Test value=332.

EXAMPLE 20

(a) In a heating bath having a temperature of 60° C. a mixture was prepared of 800 ml. 30% H$_2$O$_2$ and 400 ml. of a distillate obtained by recovery of the residual monomer by concentration of the corresponding mass. The distillate consisted of 1% acrolein, 7% acrylic acid and 92% water. The mixture was subjected to stirring, and starting at the temperature of 50° C. 813 ml. was added dropwise within a period of about 4.5 hours. This caused the reaction temperature gradually to rise to about 80° C. After passing this maximum, the temperature slowly again decreased. After a few hours standing, precipitation was effected with 500 ml. of a 20%-concentration HCl. The precipitate was filtered, washed and dried. There was obtained a polyaldehydo-carboxylic acid having an average polymerization degree $\bar{P}$ of 79, a carboxylic content of 61% and a carbonyl content of 4%.

(b) This product was then subjected to a Cannizzaro reaction upon simultaneous condensation with formaldehyde in the manner described in the previous examples.

This resulted in a hydroxycarboxylic acid polymer of a carboxyl content of 64% and a hydroxy content of 4%. The product was suitable as a complexing agent in the form of its salt. For instance, the complex formation with Ca$^{--}$ furnished the following values: lg K$_{stab}$=1.58 (measured at an ionic strength of I=0.24 mol/l.;Hampshire Test value=202.

Without further analysis, the foregoinng will so fully reveal the gist of the present invention that others can by applying current knowledge readily adapt it for various applications without omitting features that from the standpoint of prior art fairly. constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. The process of making alkali salts of solid linear or cross-linked polymeric hydroxycarboxylic acids which in the main chain have predominantly carbon-to-carbon bonds and in which all or the major portions of the units have the formulae

and

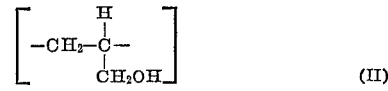

wherein R$^1$ is hydrogen, alkyl or 1–6 carbon atoms or halogen and wherein A is an alkali metal, the said units (I) and (II) being arranged in random sequence and the average frequency of the units being such as to provide for a ratio of carboxylate to hydroxyl groups between 2 and 9, and wherein the degree of polymerization is 3 to 5000, the said process comprising the steps of subjecting acrolein to polymerization with (a) acrylic acid, (b) an alkyl acrylic acid, (c) a halogenoacrylic acid, or (d) a mixture of the acids at (b) and (c) in the presence of an oxidizing agent; treating the polymerizate that is obtained with an alkali hydroxide in a Cannizzaro reaction and finally recovering the formed polymer.

2. The process of claim 1, wherein the treatment with the alkali hydroxide is effected upon simultaneous condensation with formaldehyde.

3. The process of making alkali salts of solid linear or cross-linked polymeric hydroxycarboxylic acids which in the main chain have predominantly carbon-to-carbon bonds and in which all or the major portion of the units have the formulae

and

and which additionally include an amount minor relative to said units (I) and (II) of the formula

in which formulae R$^1$ is hydrogen, alkyl of 1–6 carbon atoms or halogen and A is an alkali metal, the said units (I), (II) and (IV) being arranged in random sequence and the average frequency of the units being such as to provide for a ratio of carboxylate to hydroxyl groups between 2 and 9 and wherein the degree of polymerization is about 3 to 5000, the said process comprising the steps of subjecting acrolein to copolymerization with (a) maleic acid or maleic acid anhydride, (b) a mixture of maleic acid or maleic acid anhydride with acrylic acid, or (c) a mixture of maleic acid or maleic acid anhydride with an alkyl acrylic acid or a halogenoacrylic acid or both of these latter acids, the said copolymerization being carried out in the presence of an oxidizing agent and the maleic acid or maleic acid anhydride being present in a minor amount relative to the acrolein, acrylic acid, alkyl acrylic acid or halogenoacrylic acid; then treating the polymerizate with an alkali hydroxide in a Cannizzaro-type reaction and recovering the formed polymer.

4. The process of claim 3, wherein the treatment with the alkali hydroxide is effected upon simultaneous condensation with formaldehyde.

References Cited
UNITED STATES PATENTS

| | | | |
|---|---|---|---|
| 3,227,688 | 1/1966 | Kern et al. | 260—67 U |
| 3,387,029 | 6/1968 | Hartel et al. | 260—67 UX |
| 3,455,882 | 7/1969 | Hartel et al. | 260—67 U |
| 3,474,062 | 10/1969 | Smith et al. | 260—67 UX |

WILLIAM H. SHORT, Primary Examiner

L. M. PHYNES, Assistant Examiner